P. ECKENROTH.
VALVE.
APPLICATION FILED JAN. 31, 1913.

1,217,725.

Patented Feb. 27, 1917.

Witnesses—
William T. Nase
Wills A. Burrowes

Inventor:—
Philip Eckenroth.
by his Attorneys—
Howson & Howson

UNITED STATES PATENT OFFICE.

PHILIP ECKENROTH, OF PHILADELPHIA, PENNSYLVANIA, ASSIGNOR OF SIX TWENTY-FIFTHS TO WILBUR F. HAMILTON, OF CYNWYD, PENNSYLVANIA, AND SIX TWENTY-FIFTHS TO FRANK J. MILON, OF WILLIAM PENN, PENNSYLVANIA.

VALVE.

1,217,725.  Specification of Letters Patent.  Patented Feb. 27, 1917.

Application filed January 31, 1913. Serial No. 745,419.

*To all whom it may concern:*

Be it known that I, PHILIP ECKENROTH, a citizen of the United States, residing in Philadelphia, Pennsylvania, have invented certain Improvements in Valves, of which the following is a specification.

The object of my invention is to provide a valve with means designed to prevent the cutting of the seat by the wire-drawing of steam or liquid under high pressures.

My invention comprises the provision of an auxiliary seat adjacent the main seat, over which auxiliary seat the steam or liquid under pressure must pass before it passes the main seat; space being provided between the auxiliary seat and the main seat for the expansion of an initial body of steam or liquid leaking by said auxiliary seat so that in passing the main seat, it will be in sufficient volume to avoid cutting of the latter.

Figure 1:
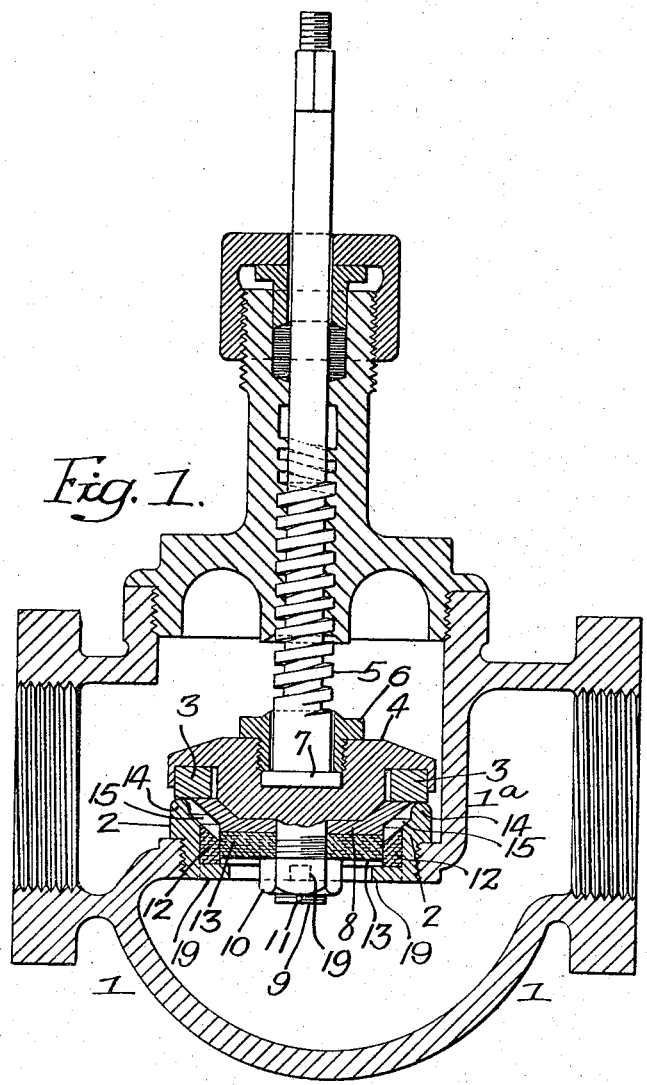
Figure 2:
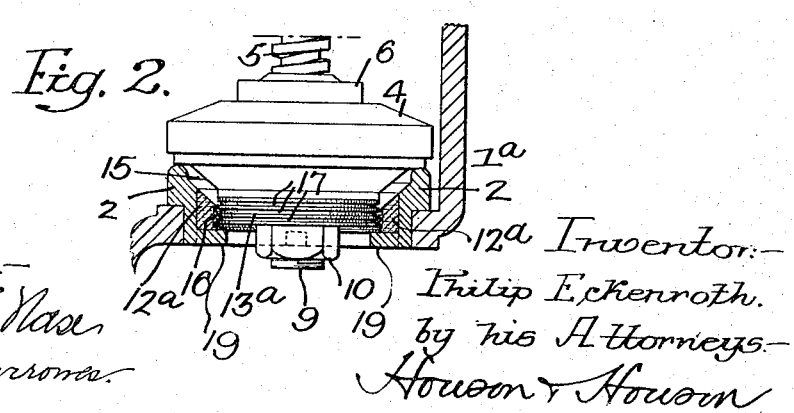

These and other features of my invention are more fully described hereinafter, reference being had to the accompanying drawings, in which:

Figure 1, is a sectional elevation of a valve having and containing the improvements forming the subject of my invention; and Fig. 2, is a detached view of the valve and its seat, showing a modified construction within the scope of my invention.

While my present invention has been applied to what is known as a "globe" valve, it will be understood that its use is not limited to employment with such structures, and with modifications obvious to any one skilled in the art, my improvements may be applied to valves of any description.

In the structure shown in Fig. 1, 1 represents the shell or casing of a valve having the usual diaphragm or wall 1ª which, in the present instance, is provided with a removable seat 2, engaged by a packing disk or ring 3 of a valve body 4 carried by a stem 5; said stem being retained in place by a threaded collar 6 of usual form engaging a head 7 on the end of said stem. The packing disk or ring 3 is held in place by a plate 8 of the usual type, which is passed over a threaded stem 9, which may be integral with the valve body 4, and having a nut 10.

This nut may be held against movement by a cotter pin 11 extending through the same, and all of the parts above enumerated may be of usual construction.

My improvements consist in recessing the inner wall of the seat 2 and providing the same with a ring 12 of suitable material, which may be of metal or of any suitable composition available for the purpose, having a truly annular inner wall, and providing the valve structure with a disk 13 of similar material, held in place by the nut 10 (and, if desired, an interposed washer,) which disk fits within the ring 12 carried by the seat, forming a substantially fluid-tight joint. The seat 2 is preferably provided with an annular wall 14 with a rounded upper edge forming the seat proper, and from a point below said upper edge the body of the seat slopes inwardly, as clearly indicated, which slope is substantially parallel to the taper or bevel of the plate 8, securing the packing ring 3 to the valve. The upper edge of the ring 12 also follows this bevel. By this means, a space 15 is provided in which any steam or other fluid leaking past the auxiliary seat formed by the ring 12 and the disk 13 may enter and expand so that when the packing ring of the valve is raised from said seat 2 the steam, instead of wire-drawing and cutting said seat, will not pass the same in any appreciable quantity until the valve is lifted entirely clear of said seat; any steam within said space 15 having expanded and being without sufficient pressure to cut or otherwise injure said seat.

In Fig. 2, I have shown a modified construction in which the ring or auxiliary seat, indicated at 12ª, and the disk, indicated at 13ª, are annularly grooved at 16 and 17, respectively, so as to provide pockets for the presence of a body of steam or liquid, thereby forming seals and when such bodies pass to the space 15 expanding therein.

No claim is made herein to the grooved arrangement of the auxiliary seat and disk; the same being claimed in my application filed January 31, 1913, Serial No. 745,420.

It will be seen from this construction that the auxiliary seat and disk while subject to possible wear, can be readily renewed and that the main seat of the valve is absolutely prevented from cutting due to wire-drawing of the steam or any liquid under pressure.

The object of the plain or grooved construction of disk and seat ring is to practically stop flow of steam through the valve during the initial operation of opening and closing the same, thereby eliminating all cutting of the valve seat and disk. At the opening of the valve, the pressure that has accumulated in the annular space 15 through steam or fluid leaking past seat and disk rings or cutting surfaces, is constantly removed by reason of the fact that the area of the annular space and the opening between faces of disk and seat as they are moved apart, becoming rapidly greater than the area of space between cutting surfaces of the auxiliary seat 12 and disk 13. This continues so until lower edge of disk 13 nears the top of ring 12 when pressure will be built up in the space formed by the chamber of the valve; the surfaces of seat 2 and disk 3 being far apart and all danger of such cutting surfaces being eliminated. In closing, the area between seat 2 and face of disk 3 and annular space 15 is so much greater than the space around cutting surfaces of the auxiliary seat 12 and disk 13 that the valve is closed before pressure can build up in the annular space 15; therefore all cutting of valve surfaces is eliminated.

The valve seat 2 may be threaded into the diaphragm or partition 1ª, as shown in Fig. 1, or it may be forced therein, as shown in Fig. 2. The rings 12 are preferably supported by lugs 19, as clearly indicated in Figs. 1 and 2.

I claim:

The combination, in a valve structure, of a casing having a partition, a main valve, a removable seat therefor mounted in said partition, a removable ring forming an auxiliary seat carried by the main seat below the same, inwardly disposed lugs carried by said main seat for supporting said auxiliary seat, a removable disk for peripheral engagement with the vertical portion of said auxiliary seat carried by the main valve below the same, and means for securing said disk to said main valve.

In testimony whereof, I have signed my name to this specification, in the presence of two subscribing witnesses.

PHILIP ECKENROTH.

Witnesses:
 MURRAY C. BOYER,
 JOS. H. KLEIN.

Copies of this patent may be obtained for five cents each, by addressing the "Commissioner of Patents, Washington, D. C."